(12) United States Patent
Fujita et al.

(10) Patent No.: US 9,096,185 B2
(45) Date of Patent: Aug. 4, 2015

(54) GROMMET

(71) Applicant: SUMITOMO WIRING SYSTEMS, LTD., Mie (JP)

(72) Inventors: Tetsuya Fujita, Yokkaichi (JP); Yuusuke Andou, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 125 days.

(21) Appl. No.: 14/049,509

(22) Filed: Oct. 9, 2013

(65) Prior Publication Data

US 2014/0196931 A1 Jul. 17, 2014

(30) Foreign Application Priority Data

Jan. 17, 2013 (JP) .................................. 2013-006766

(51) Int. Cl.
*H02G 3/22* (2006.01)
*B60R 16/02* (2006.01)

(52) U.S. Cl.
CPC .................................. *B60R 16/0222* (2013.01)

(58) Field of Classification Search
USPC .......... 174/152 G, 153 G; 16/2.1, 2.2; 248/56
See application file for complete search history.

(56) References Cited

U.S. PATENT DOCUMENTS

| | | | |
|---|---|---|---|
| 6,240,597 B1* | 6/2001 | Mochizuki | 16/2.1 |
| 8,108,968 B2* | 2/2012 | Pietryga et al. | 16/2.2 |
| 8,704,098 B2* | 4/2014 | Agusa | 174/152 G |

FOREIGN PATENT DOCUMENTS

| | | |
|---|---|---|
| JP | 09-27226 | 1/1997 |
| JP | 11-234862 | 8/1999 |
| JP | 2008-218110 | 9/2008 |

* cited by examiner

*Primary Examiner* — Dhirubhai R Patel
(74) *Attorney, Agent, or Firm* — Greenblum & Bernstein, P.L.C.

(57) ABSTRACT

A grommet includes a resin inner assembled to a grommet main body composed of a rubber or elastomer, a seal lip provided in the grommet main body to press against an outer surface of a body panel, and an engagement tab provided in the resin inner to engage with a periphery of a through-hole in the body panel. A base portion of the seal lip projects from a resin inner holder of the grommet main body: An inclined portion projects outward from the base portion. The inclined portion has a seal projection. A plurality of deformation prevention ribs are provided in a circumferential direction with intervals therebetween to connect the front end side of the inclined portion and the resin inner holder.

4 Claims, 7 Drawing Sheets

(Proper position) (Oblique insertion)

GROMMET

CROSS-REFERENCE TO RELATED APPLICATIONS

The present application claims priority under 35 U.S.C. §119 of Japanese Application No. 2013-006766, filed on Jan. 17, 2013, the disclosure of which is expressly incorporated by reference herein in its entirety.

BACKGROUND OF THE INVENTION

1. Field of the Invention

The present invention relates to a grommet for a wire harness, specifically, a grommet mounted on a wire harness routed in an automobile and mounted in a through-hole of a vehicle body panel, the grommet concurrently enhancing waterproof performance of a seal lip thereof tightly attached to a periphery of the through-hole and reducing force to insert the grommet.

2. Description of Related Art

A grommet for a wire harness of this type is attached to a wire harness inserted through a through-hole of a body panel that partitions inside and outside of a passenger cabin. Then, a seal lip is tightly attached to a periphery of the through-hole to shield the passenger cabin from water.

Figure 9A:
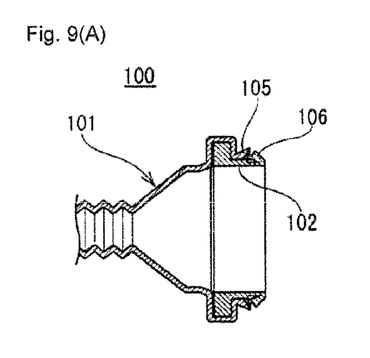
FIGS. 9(A) and 9(B) are each cross-sectional view of a conventional example.
Figure 9B:
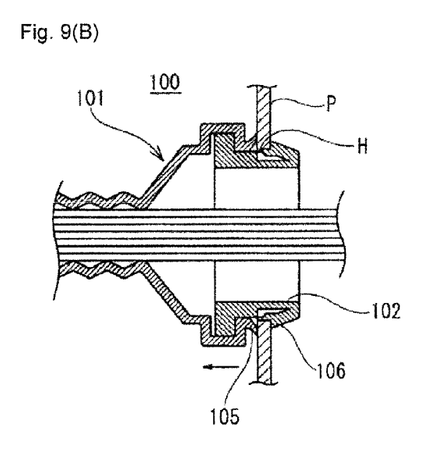

For example, in a grommet 100 disclosed in FIGS. 9(A) and 9(B) of Japanese Patent Laid-Open Publication No. 2008-218110, which is an earlier application of the inventor of the present invention, a resin inner 102 is combined with a grommet main body 101 composed of a rubber or elastomer; a periphery of a through-hole H in a body panel P is placed between a seal lip 105 provided to the grommet main body 101 and an engagement tab 106 provided to the resin inner 102; and the seal lip 105 is pressed against the periphery for protection from water.

In order to increase waterproof performance of a grommet mounted in a through-hole, a large insertion force is required to insert the grommet into the through-hole, thus increasing a burden on a worker. In particular, with a seal lip that lacks flexibility, the insertion force cannot be reduced during insertion of the grommet. Meanwhile, a readily flexible seal lip can reduce the insertion force; however, the waterproof performance decreases in a case where the seal lip bends and deforms during insertion in a state where the grommet is mounted in the through-hole.

In the grommet shown in FIGS. 9(A) and 9(B) above as well, when the seal lip 105 does not bend, it is difficult to insert the resin inner 102 into the through-hole H in the body panel P. However, when the seal lip 105 bends outward and deforms excessively, the seal lip 105 cannot be directly pressed against the body panel P, and thus reduces sealing performance.

SUMMARY OF THE INVENTION

In view of the circumstance above, the present invention is provided to allow a seal lip to bend appropriately to reduce insertion force and prevent excessive deformation during insertion of a grommet, and to allow the seal lip to be pressed against a periphery of a through-hole in a proper orientation to increase waterproof performance after mounting of the grommet.

To address the circumstance above, an aspect of the present invention provides a grommet including a resin inner assembled to a grommet main body composed of one of a rubber and elastomer, a seal lip provided in the grommet main body to press against an outer surface of a body panel, and an engagement tab provided in the resin inner to engage with a periphery of a through-hole in the body panel. A base portion of the seal lip projects from a resin inner holder provided to the grommet main body. An inclined portion projects outward from the base portion. The inclined portion has a seal projection. A plurality of deformation prevention ribs are provided in a circumferential direction with intervals therebetween to connect a front end side of the inclined portion and the resin inner holder.

In the grommet above, a closed portion preferably projects in a diameter direction from an outer periphery of a wire harness insertion tubular portion. The resin inner holder is preferably folded from an outer peripheral end of the closed portion, the resin inner holder having a square U shape in cross section and an open inner peripheral surface. The seal lip preferably projects from an outer surface of a thin folded side portion of the resin inner holder, the seal lip including the base portion and the inclined portion and having a V shape in cross section. The deformation prevention ribs are preferably provided between the front end side of the seal lip and the folded side portion with 90-degree intervals between the ribs.

As described above, the seal lip, which projects in a V-shape in cross section, allows the base portion to collapse and readily bend when a body panel is pressed. This reduces force to insert the grommet. While the seal lip has a shape that readily bend, the front end side of the inclined portion of the seal lip is connected to the resin inner holder through the deformation prevention ribs. This allows the seal lip to restore the original position after bending and prevents excessive bending. Thereby, water is prevented from entering through a gap between the seal lip and the body panel generated by excessive deformation of the seal lip during insertion due to oblique insertion of the grommet or the like.

Furthermore, the resin inner preferably includes a tubular portion and an annular attachment portion, the tubular portion being connected to a tubular portion of the grommet main body, the attachment portion projecting from one end of the tubular portion. The attachment portion is preferably pressed in and fixated to the resin inner holder. A recess is preferably provided in a location corresponding to a base of the base portion of the seal lip.

As described above, with the recess provided in the attachment portion of the resin inner, the base of the base portion is guided to the recess when the seal lip bends, and thus the inclined portion is regulated to bend inward. The seal projection of the seal lip is then evenly pressed against the body panel to increase the sealing performance.

Accordingly, in the grommet of the present invention, the deformation prevention ribs are provided to the projection end side of the seal lip to connect with the resin inner holder. This prevents excessive deformation and outward deformation of the seal lip, thus allowing the seal projection of the seal lip to be evenly pressed against the body panel to increase the sealing performance.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

A grommet according to an embodiment of the present invention is described below with reference to the drawings. FIGS. 1 to 7 illustrate the grommet according to the embodiment of the present invention. A grommet 1 has a flexible grommet main body 2 composed of a rubber or elastomer and a resin inner 3 incorporated into the grommet main body 2.

The grommet main body 2 has a wire harness insertion tubular portion including a small-diameter tubular portion 5 through which a wire harness is tightly attached and inserted and a middle-diameter tubular portion 6 that extends from the small-diameter tubular portion 5. The middle-diameter tubular portion 6 bends in an L shape. An annular brim-shaped closed portion 7 projects in an outer diameter direction from an outer periphery on the bent side of the middle-diameter tubular portion. A resin inner holder 8 is provided along an entire outer periphery of the closed portion 7, the resin inner holder 8 having a square U-shape, bending from the outer periphery of the closed portion 7, and having an inner peripheral surface open to a space defined with the closed portion 7. A folded side portion 8a bending inward from an outer periphery of the resin inner holder 8 is thin and readily flexible. A seal lip 9 projects along the entire periphery from a middle position in a diameter direction of an outer surface of the folded side portion 8a.

Figure 7:
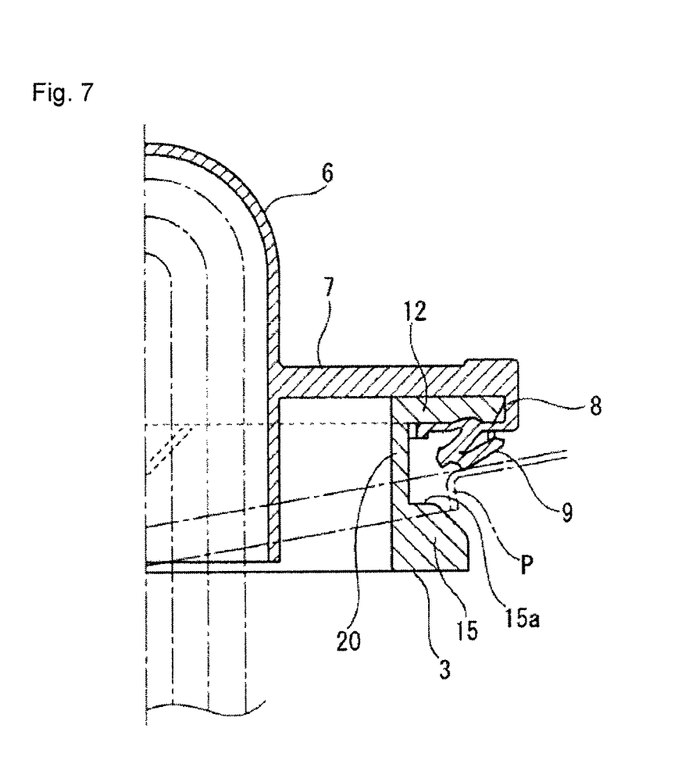
FIG. 7 is a view illustrating a state where a seal lip of a grommet is pressed against a body panel.

The seal lip 9 has a V shape and includes a base portion 9a in an axis direction; an inclined portion 9b projecting obliquely inward in the outer diameter direction as indicated by an arrow U from a front end of the base portion 9a; and two seal projections 9c and 9d having a distance therebetween on an outer surface of the inclined portion 9b. When the seal lip 9 is pressed against the body panel P, the base portion 9a is bent in two fold as shown in FIG. 7.

Figure 8A:
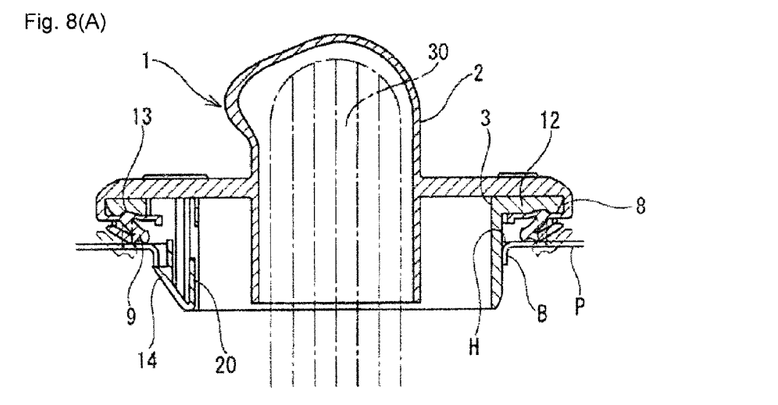
FIG. 8(A) is a cross-sectional view of a state where a grommet is mounted in a through-hole.
Figure 8B:
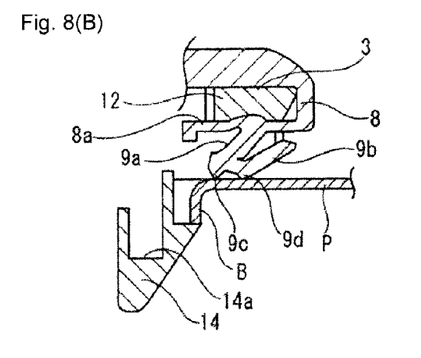
FIG. 8(B) is an enlarged cross-sectional view of a main portion.
Figure 8C:
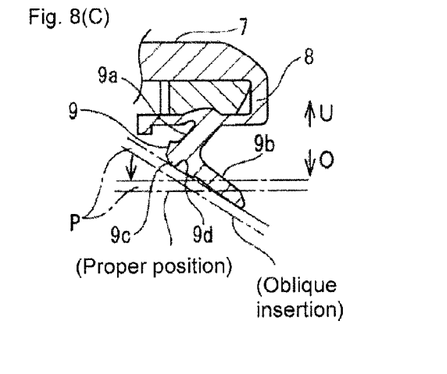
FIG. 8(C) is a view illustrating an issue.

When the grommet 1 is pressed against the body panel P, waterproof performance is compromised unless the seal projections 9c and 9d are pressed in contact with the body panel P due to excessive deformation of the seal lip 9. As shown in FIG. 8(C), for example, the grommet is obliquely pressed into the body panel P, the inclined portion 9b of the seal lip 9 deforms outside O in a direction opposite to inside U, and then the grommet is mounted in the body panel P in a proper orientation. In this case, the seal projections 9c and 9d of the seal lip 9 are not directly pressed against the body panel P, thus reducing sealing force.

Figure 5A:
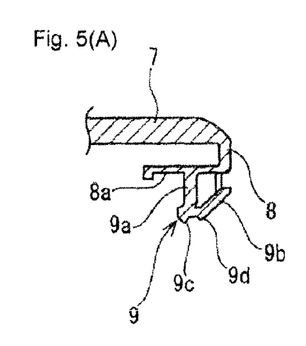
FIG. 5(A) is a cross-sectional view along A-A of FIG. 4.
Figure 5B:
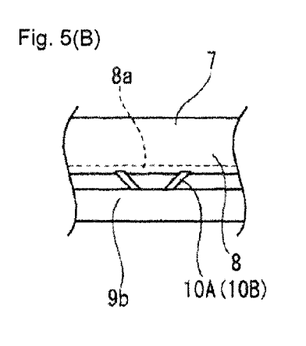
FIG. 5(B) is a fragmentary view from B of FIG. 4.
Figure 5C:
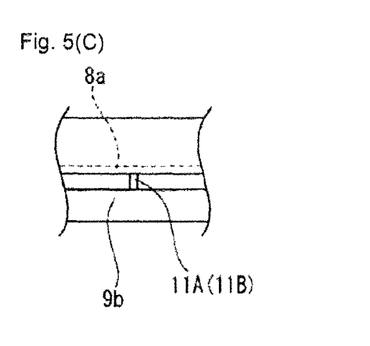
FIG. 5(C) is a fragmentary view from C of FIG. 4.
Figure 6A:
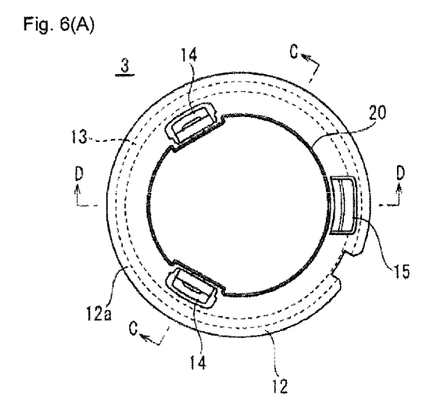
FIG. 6(A) is a plan view of a resin inner.
Figure 6B:
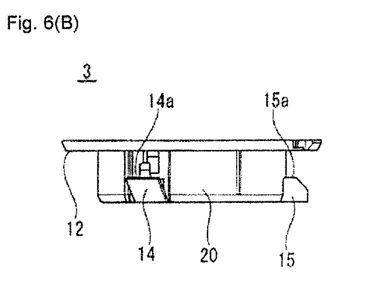
FIG. 6(B) is a front view of the resin inner.
Figure 6C:
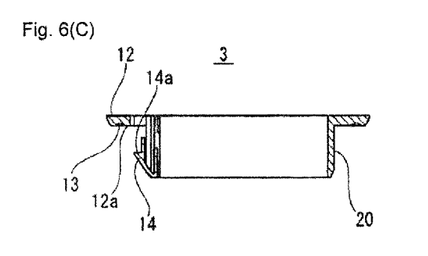
FIG. 6(C) is a cross-sectional view along C-C of FIG. 6(A)
Figure 6D:
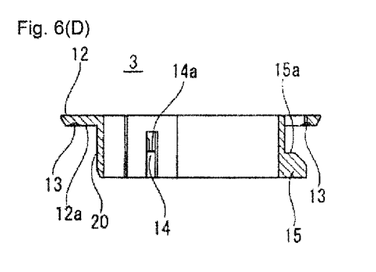
FIG. 6(D) is a cross-sectional view along D-D of FIG. 6(A)

To prevent excessive deformation, particularly outward deformation, of the seal lip, deformation prevention ribs 10A, 10B, 11A, and 11B are provided with 90-degree intervals therebetween between the inclined portion 9b of the seal lip 9 and the folded side portion 8a, as shown in FIGS. 4 and 5(A) to 5(C). As shown in FIG. 5(B), the deformation prevention ribs 10A and 10B are each V-shaped connecting portion that connects a rear surface on a front end side of the inclined portion 9b of the seal lip 9 and the folded side portion 8a in an opposite position. The deformation prevention ribs 10A and 10B are provided in opposing two locations in the diameter direction. As shown in FIG. 5(C), the deformation prevention ribs 11A and 11B are each I-shaped connecting portion that connects the rear surface of the inclined portion 9b of the seal lip 9 and the folded side portion 8a in the opposite position. The deformation prevention ribs 11A and 11B are provided in opposing two locations in the diameter direction orthogonal to the deformation prevention ribs 10A and 10B.

The resin inner 3 has, as shown in FIGS. 6(A) to 6(D), a brim-shaped attachment portion 12 projecting from one end of a tubular portion 20 along an entire periphery. The attachment portion 12 is pressed into the resin inner holder 8 of the grommet main body 2 through an inner peripheral opening and is thus assembled thereto. In addition, an outer surface 12a, which is brought into contact with the folded side portion 8a of the attachment portion 12, has a recess 13 in a position corresponding to a projecting position of the base portion 9a of the seal lip 9. With the recess 13 provided, when the seal lip 9 is pressed, the recess 13 allows the base portion 9a to set therein so as to direct the inclined portion 9b to collapse inward, and thus prevents outward deformation.

Figure 1:
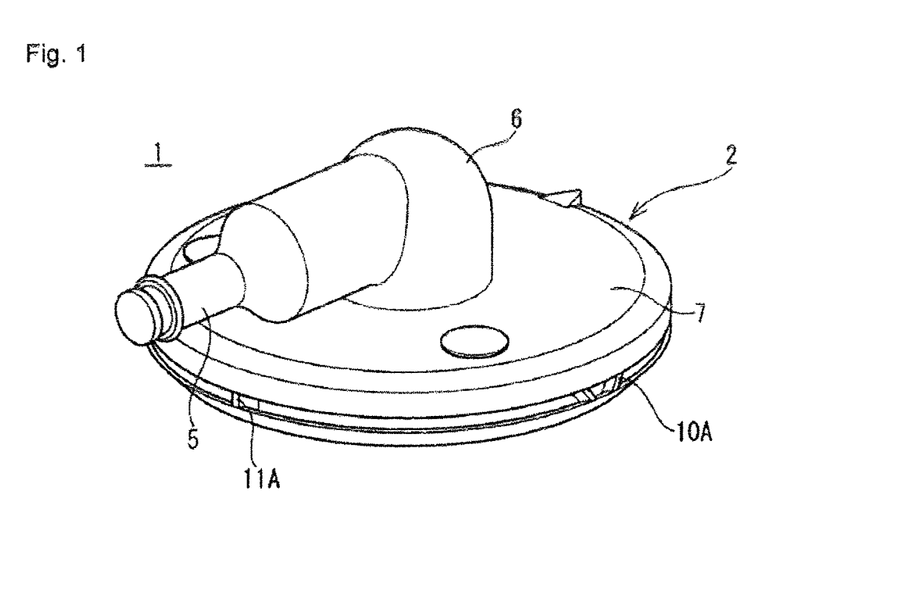
FIG. 1 is a perspective view of a grommet according to an embodiment of the present invention.
Figure 2:
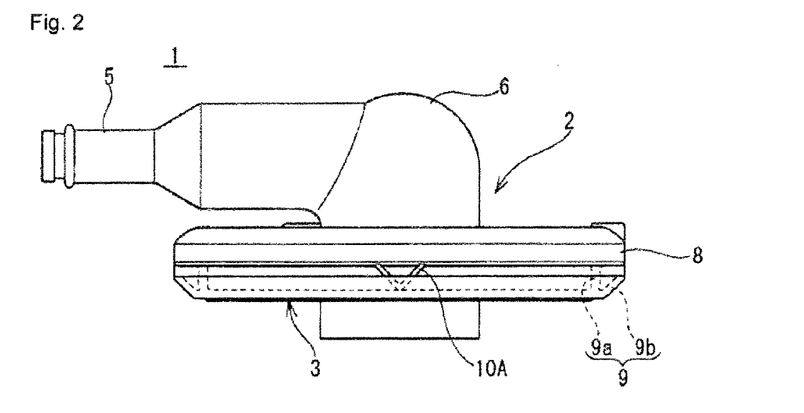
FIG. 2 is a front view of FIG. 1.
Figure 3:
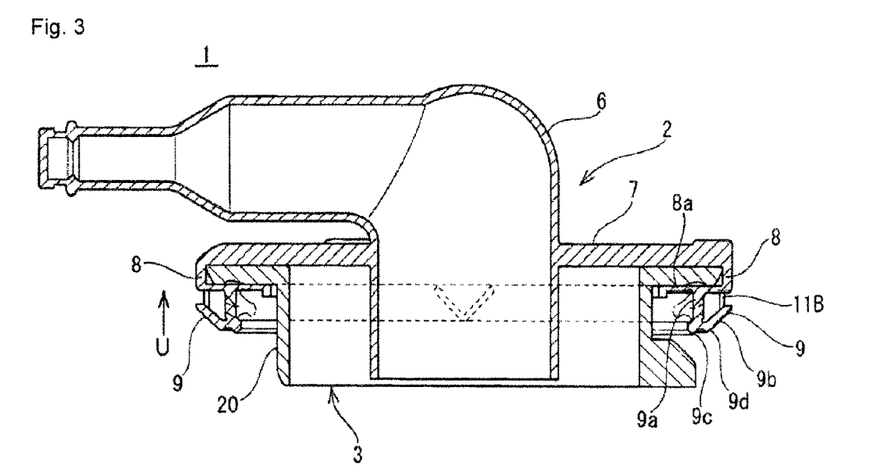
FIG. 3 is a vertical cross-sectional view of FIG. 2.
Figure 4:
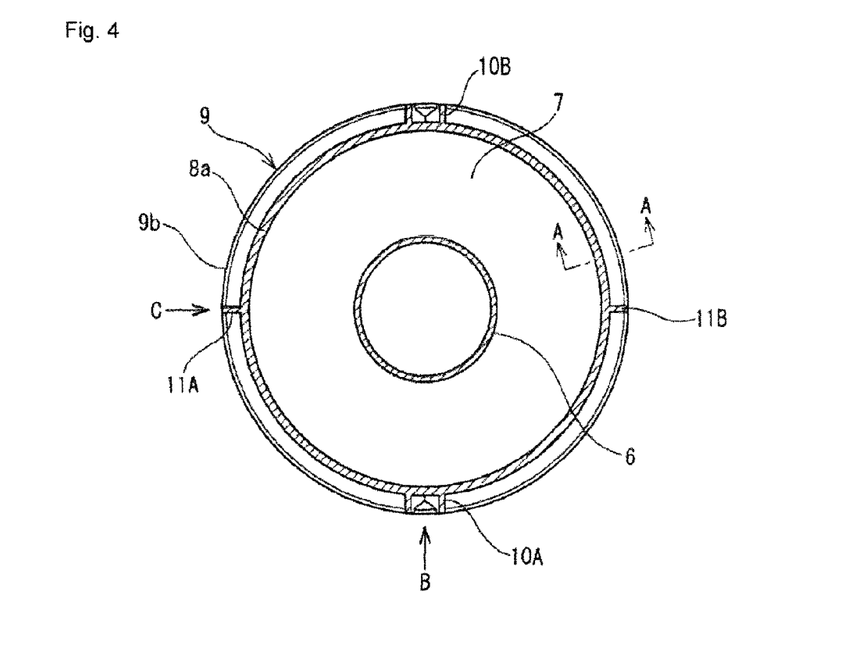
FIG. 4 is a horizontal cross-sectional view of a grommet main body.

Two engagement tabs 14 project with 120 degrees apart from each other from an outer peripheral surface on a projection side of the tubular portion 20 of the resin inner 3. A stabilization rib 15 projects 120 degrees away from the engagement tabs 14. As shown in FIG. 3, engagement surfaces 14a of the engagement tabs 14 and an engagement surface 15a of the stabilization rib 15 are positioned approximately 0 to 3 min apart from the seal projections 9c and 9d of the seal lip 9 in a state where the resin inner 3 is assembled to the grommet main body 2.

A process is described below for attaching the grommet 1 to a wire harness 30 and mounting the grommet 1 to the through-hole H of the body panel P. As shown in FIGS. 7 and 8(A) to 8(C), the through-hole H in the body panel P has a burring B on a periphery of the through-hole H. The grommet 1 fixated to an outer peripheral surface of the wire harness 30 is pressed into the through-hole H. The engagement surfaces 14a of the engagement tabs 14 and the engagement surface 15a of the stabilization rib 15 of the resin inner 3 are brought into contact with a projection end of the burring B, and thus the grommet 1 is engaged with the body panel P.

Until the engagement tabs 14 and the stabilization rib 15 of the resin inner 3 of the grommet 1 climb over the burring B, the seal lip 9 of the grommet main body 2 is pressed by the body panel P in the periphery of the through-hole H and the base portion 9a of the seal lip 9 bends as shown in FIG. 7. When the seal lip 9 bends as above, the inclined portion 9b is directed to incline in the inward U direction, but not outward O, since the front end side of the inclined portion 9b is connected to the folded side portion 8a through the deformation prevention ribs 10A, 10B, 11A, and 11B. In addition, the recess 13 is provided in the attachment portion 12 of the resin inner in the position opposite to the base portion 9a of the seal lip 9. As shown in FIG. 8(B), a base of the base portion 9a of the seal lip 9 is directed to set in the recess 13. When the base portion 9a sets in the recess 13, the inclined portion 9b inclines inward and the deformation prevention ribs 10A, 10B, 11A, and 11B prevent excessive deformation.

In a case where the deformation prevention ribs 10A to 11B are not provided in the grommet main body 2 and the recess 13 is not provided in the attachment portion 12 of the resin inner 3, as shown in FIG. 8(C), when the grommet is obliquely inserted, the inclined portion 9b of the seal lip 9 inclines outside O, and when the grommet 1 is mounted in a proper orientation, a gap is formed between the seal projections 9c and 9d of the seal lip and the body panel P, and thus waterproof performance is declined.

The present invention is not limited to the embodiment above. All deformation prevention ribs may have a V shape or I shape. The number of the deformation prevention ribs may be increased. Increasing the number of the defamation prevention ribs, however, makes the seal lip 9 difficult to bend, and thus increases force to insert the grommet. The number of the deformation prevention ribs is adjusted depending on a length of the circumference. A preferred number is three or more and eight or less with constant intervals therebetween. Furthermore, the grommet main body of the embodiment is bent at 90 degrees. Alternatively, the grommet may be formed straight depending on specifications.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A grommet comprising:
   a grommet main body comprising one of a rubber and elastomer, and including a resin inner holder and a seal lip configured to press against an outer surface of a body panel; and
   a resin inner assembled to the grommet main body, and including an engagement tab configured to engage with a periphery of a through-hole in the body panel, wherein
   a base portion of the seal lip projects from the resin inner holder,
   an inclined portion of the seal lip projects outward from the base portion, the inclined portion having a seal projection, and
   a plurality of deformation prevention ribs spaced in a circumferential direction and connecting a front end side of the inclined portion of the seal lip and the resin inner holder.

2. The grommet according to claim 1, wherein
   a closed portion projects in a diameter direction from an outer periphery of a wire harness insertion tubular portion,
   the resin inner holder is folded from an outer peripheral end of the closed portion, the resin inner holder having a square U shape in cross section and an open inner peripheral surface,
   the seal lip projects from an outer surface of a thin folded side portion of the resin inner holder, the seal lip comprising the base portion and the inclined portion and having a V shape in cross section, and
   the deformation prevention ribs are provided between the front end side of the inclined portion of the seal lip and the folded side portion with 90-degree intervals between the ribs.

3. The grommet according to claim 2, wherein
   the resin inner comprises a tubular portion and an annular attachment portion, the tubular portion being connected to a tubular portion of the grommet main body, the attachment portion projecting from one end of the tubular portion, and
   the attachment portion is pressed in and fixated to the resin inner holder, and includes a recess in a location corresponding to a base of the base portion of the seal lip.

4. The grommet according to claim 1, wherein
   the resin inner comprises a tubular portion and an annular attachment portion, the tubular portion being connected to a tubular portion of the grommet main body, the attachment portion projecting from one end of the tubular portion, and
   the attachment portion is pressed in and fixated to the resin inner holder, and includes a recess in a location corresponding to a base of the base portion of the seal lip.

* * * * *